United States Patent
Lange

(10) Patent No.: US 12,237,741 B2
(45) Date of Patent: Feb. 25, 2025

(54) DRIVE MACHINE FOR A MOTOR VEHICLE HAVING A FLUID-DISTRIBUTING CHAMBER

(71) Applicant: Dr. Ing. h.c. F. Porsche Aktiengesellschaft, Stuttgart (DE)

(72) Inventor: Johannes Lange, Dettenheim (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 350 days.

(21) Appl. No.: 17/864,440

(22) Filed: Jul. 14, 2022

(65) Prior Publication Data

US 2023/0024530 A1    Jan. 26, 2023

(51) Int. Cl.
*H02K 3/24*     (2006.01)
*H02K 5/20*     (2006.01)
*H02K 9/19*     (2006.01)

(52) U.S. Cl.
CPC .............. *H02K 3/24* (2013.01); *H02K 5/203* (2021.01); *H02K 9/19* (2013.01)

(58) Field of Classification Search
CPC ............ H02K 3/24; H02K 5/203; H02K 9/19; H02K 15/14
See application file for complete search history.

(56) References Cited

U.S. PATENT DOCUMENTS

| 3,995,181 A * | 11/1976 | Suit .................... H02K 3/24 165/104.31 |
| 5,081,382 A * | 1/1992 | Collings ............... H02K 3/24 310/260 |
| 2014/0042841 A1* | 2/2014 | Rippel .................. H02K 9/193 310/54 |
| 2015/0308456 A1* | 10/2015 | Thompson .............. F04D 17/12 417/244 |
| 2019/0207457 A1 | 7/2019 | Hamiti et al. |

(Continued)

FOREIGN PATENT DOCUMENTS

| DE | 102016101705 A1 | 8/2017 |
| DE | 102019117893 A1 | 1/2021 |
| JP | S58162765 U | 10/1983 |

(Continued)

*Primary Examiner* — Bernard Rojas
(74) *Attorney, Agent, or Firm* — LEYDIG, VOIT & MAYER, LTD.

(57) ABSTRACT

An electrical machine including a rotor and a stator occupying a substantially hollow-cylindrical spatial region, the stator including a stator core with a stator winding and fluid ducts which extend in an axial direction from a first axial side to an opposite second axial side, wherein a fluid-distributing chamber with a coolant inflow is provided on the first axial side, the coolant inflow communicates with the fluid-distributing chamber and the fluid-distributing chamber communicates with the fluid ducts, a fluid-collecting chamber with a coolant outflow is provided on the second axial side, the fluid-collecting chamber communicates with the coolant outflow and the fluid-collecting chamber collects the coolant, the coolant inflow is arranged on the first axial side on a first circumferential side and the coolant outflow is arranged on the second axial side, a bypass duct is provided, and the fluid inlet is arranged on the second axial side.

14 Claims, 1 Drawing Sheet

(56) References Cited

U.S. PATENT DOCUMENTS

2021/0001714 A1 1/2021 Oechslen

FOREIGN PATENT DOCUMENTS

| | | |
|---|---|---|
| JP | H0327749 A | 2/1991 |
| JP | 4156251 A | 5/1992 |
| JP | 2003047200 A | 2/2003 |
| JP | 2004229390 A | 8/2004 |
| JP | 2012090411 A | 5/2012 |
| JP | 2014033584 A | 2/2014 |

* cited by examiner

DRIVE MACHINE FOR A MOTOR VEHICLE HAVING A FLUID-DISTRIBUTING CHAMBER

CROSS REFERENCE TO RELATED APPLICATIONS

This application claims benefit to German Patent Application No. DE 10 2021 118 752.4, filed on Jul. 20, 2021, which is hereby incorporated by reference herein.

FIELD

The invention relates to an electrical machine, in particular in the form of a drive machine for an electrically driveable motor vehicle.

BACKGROUND

Electrically driveable motor vehicles are known in the prior art. They have electrical machines which are used for driving the motor vehicle. These electrical machines typically have a rotor and a stator, which are subjected to thermal loading during operation of the electrical machine on account of the current flow through the conductors, through which current flows, of the electrical machine and on account of eddy current losses and other losses, and therefore cooling of the electrical machine is necessary.

Various stator cooling methods for cooling the stator of the electrical machines are known in the prior art. Reference is made to DE 10 2016 101 705 A1 and DE 10 2019 117 893 A1 in this respect.

DE 10 2016 101 705 A1 discloses an electrical machine in which the end windings of the stator are each supplied with a cooling fluid independently of one another, so that a coolant inflow and a cooling fluid outflow are provided at both axial end regions of the stator in order to be able to supply both of the end windings of the stator with a coolant for cooling purposes.

DE 10 2019 117 893 A1 discloses an electrical machine in which the stator is supplied with a coolant via a coolant inflow at one axial end, the coolant flowing through the stator in the axial direction in a manner distributed over the circumference for the purpose of cooling said stator, with the coolant exiting again via a coolant outflow at the other axial end, with the coolant outflow being arranged on the opposite circumferential side in relation to the coolant inflow.

Electrical machines of this kind with stator cooling by means of coolant have the disadvantage that the coolant flows through the stator in an axial direction from a first axial side to the opposite second axial side and in so doing from a first circumferential side on the first axial side, at which the coolant flows in, to the opposite second circumferential side on the second axial side, where said coolant flows out. This creates a coolant flow with an only small flow rate in the region of the end winding on the second axial side in the region of the first circumferential side, this adversely affecting the cooling in this local region, so that the temperature of the stator there is above the temperature of the stator elsewhere, and therefore the maximum permissible temperature of the stator could be reached more quickly and even exceeded there, this potentially either reducing the power of the electrical machine because limiting processes would have to be initiated or damaging the stator if excessively high temperatures were to prevail in this region for too long.

SUMMARY

In an embodiment, the present disclosure provides an electrical machine in the form of a drive machine of an electrically driven motor vehicle comprising a rotor and a stator that occupies a substantially hollow-cylindrical spatial region, the stator comprising a stator core with a stator winding and fluid ducts which extend in the stator in an axial direction from a first axial side to an opposite second axial side, wherein a fluid-distributing chamber with a coolant inflow is provided on the first axial side, the coolant inflow communicates with the fluid-distributing chamber and the fluid-distributing chamber communicates with the fluid ducts for the purpose of distributing an inflowing coolant to the fluid ducts, a fluid-collecting chamber with a coolant outflow is provided on the second axial side, the fluid-collecting chamber communicates with the coolant outflow and the fluid-collecting chamber collects the coolant arriving from the fluid ducts and conducts it to the coolant outflow, the coolant inflow is arranged on the first axial side on a first circumferential side and the coolant outflow is arranged on the second axial side on a second circumferential side, a bypass duct is provided, which leads from the coolant inflow toward a fluid inlet into the fluid-collecting chamber, and the fluid inlet is arranged on the second axial side on the first circumferential side.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
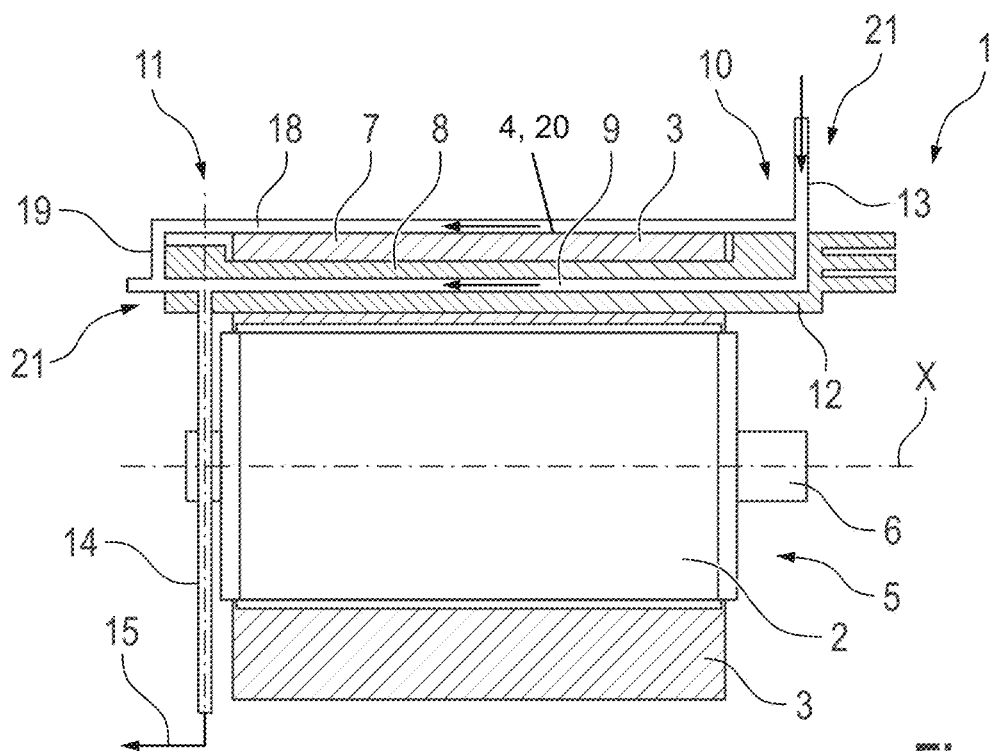
FIG. 1 shows a diagrammatic sectional illustration of an exemplary embodiment according to the invention of an electrical machine with a section along the rotor axis.

In an embodiment, the present invention provides an electrical machine which exhibits improved cooling, so that the performance of the electrical machine and in particular the continuous power of the electrical machine are increased and damage on account of excessively high local temperatures can be avoided.

One exemplary embodiment of the invention relates to an electrical machine, in particular in the form of a drive machine of an electrically driven motor vehicle, having a rotor and having a stator, wherein the stator occupies a substantially hollow-cylindrical spatial region and has a stator core with a stator winding, wherein the stator has fluid ducts which extend in the stator in an axial direction from a first axial side to an opposite second axial side, wherein a fluid-distributing chamber with a coolant inflow is provided on the first axial side, wherein the coolant inflow communicates with the fluid-distributing chamber and the fluid-distributing chamber communicates with the fluid ducts for the purpose of distributing an inflowing coolant to the fluid ducts, and wherein a fluid-collecting chamber with a coolant outflow is provided on the second axial side, wherein the fluid-collecting chamber communicates with the coolant outflow and the fluid-collecting chamber collects the coolant arriving from the fluid ducts and conducts it to the coolant outflow, wherein the coolant inflow is arranged on the first axial side on a first circumferential side and the coolant outflow is arranged on the second axial side on a second circumferential side, wherein a bypass duct is provided, which leads from the coolant inflow, toward a fluid inlet, into the fluid-collecting chamber, wherein the fluid inlet is arranged on the second axial side on the first circumferential side. As a result, the coolant is conducted through the bypass duct additionally into the region of the stator in which cooling is impeded on account of the geometry of the throughflow of the main coolant flow, and therefore adequate and improved cooling is established in this region too.

In one exemplary embodiment, it is also advantageous when the stator has a stator housing which bounds the stator on the outside, wherein the bypass duct runs along the stator housing in an axial direction from the first axial side to the second axial side. As a result, the bypass duct can be arranged in a stable and permanently secure manner, so that it meets the requirements in an operationally reliable manner in the long term even under the harsh conditions in a motor vehicle.

In an exemplary embodiment, it is also advantageous when the bypass duct is integrated into the stator housing or is connected to the stator housing. The bypass duct is arranged in a permanently secure manner in this way. Furthermore, the advantage that simplified and cost-effective production is achieved can be achieved with the integrated configuration.

It is also advantageous when the bypass duct is in the form of a pipeline which runs outside the stator housing. In this way, a solution can be found when the bypass duct is required only in a portion of the stator housing because the power requirements are not always very high in some throttled electrical machines, and therefore a solution can be found which can be produced in a cost-effective and expedient manner for a smaller number of electrical machines.

In this case, it is particularly advantageous when the pipeline is connected, in particular is soldered, welded or adhesively bonded, to the stator housing. Secure and permanent connection can be achieved in a very simple manner in this way.

In an exemplary embodiment, it is also expedient when the bypass duct, as a fluid duct, is integrated in one piece, in particular by casting, injection-molding or by mechanical machining, such as by means of drilling for example, into the wall of the stator housing. Therefore, a bypass duct can be jointly directly integrated during production of the stator housing, this making production easier.

In an exemplary embodiment, it is particularly advantageous when the coolant inflow and the bypass duct are dimensioned in such a way that the coolant volume flow through the bypass duct corresponds to at most ⅓ of the coolant volume flow supplied to the stator and the coolant volume flow supplied through the coolant inflow corresponds to at least ⅔ of the coolant volume flow supplied to the stator. This has the effect that the main volume flow flows through the entire stator housing and cools substantially the whole of said stator housing and only a small portion of the entire volume flow of the coolant is additionally used for the vulnerable region in order to additionally supply said region with coolant and in order to implement reliable cooling there.

In an exemplary embodiment, it is also expedient when the second circumferential side is substantially opposite the first circumferential side, that is to say is arranged substantially at an angle of 180° with respect to the axis of symmetry of the stator or the axis of rotation of the rotor. This has the effect that fresh and cold coolant additionally flows through basically the entire second axial side.

In an exemplary embodiment, the coolant volume flow transported via the bypass duct is supplied at several points in a manner distributed over the circumference of the second axial side, so that the formation of local regions of high temperature, so-called hotspots, can be countered in a targeted manner. The bypass duct has outlets distributed correspondingly over the circumference in order to be able to distribute the fluid over the circumference using the bypass duct.

It is also advantageous when the stator has an end winding of the stator winding on the first axial side and/or on the second axial side. This has the effect that the stator can be produced in an effective manner.

It is also expedient when an end winding of the stator winding is arranged in the fluid-distributing chamber or in a space which is fluidically connected to the fluid-distributing chamber and/or an end winding of the stator winding is arranged in the fluid-collecting chamber or in a space which is fluidically connected to the fluid-collecting chamber. The end winding or the end windings can be cooled in an effective manner in this way.

Figure 2:
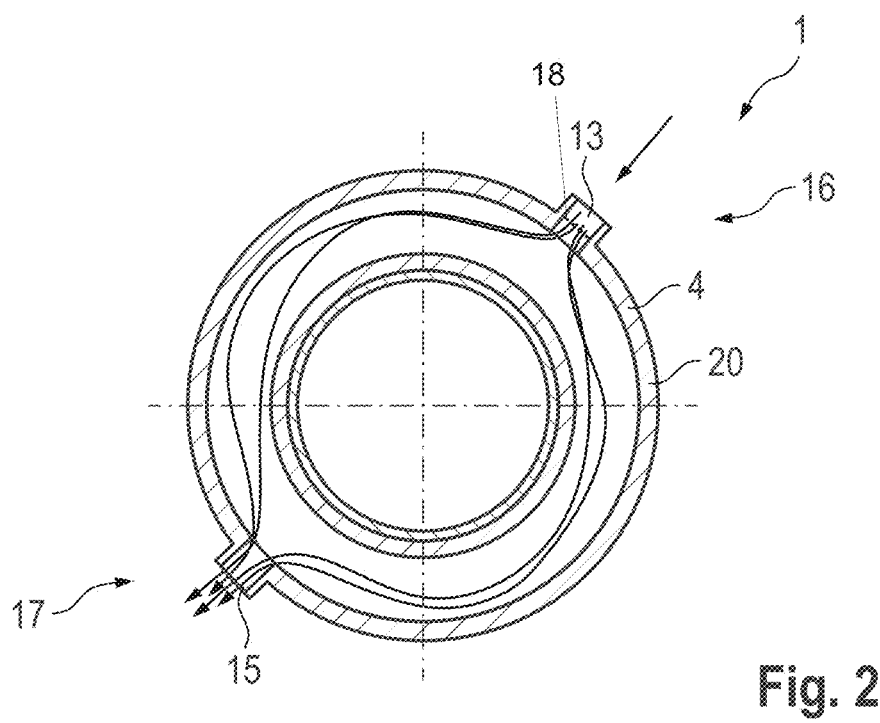
FIG. 2 shows a sectional illustration of the electrical machine of the exemplary embodiment according to the invention as per FIG. 1 with a section perpendicular to the rotor axis.

FIGS. 1 and 2 show different diagrammatic sectional illustrations of an exemplary embodiment of an electrical machine 1 according to an embodiment of the invention. The electrical machine 1 is, in particular, an electrical machine 1 which is used as a drive machine of an electrically driven motor vehicle. An electrical machine 1 of this kind can therefore be used in a motor vehicle, for example as a sole electrical machine 1 for driving wheels of one axle of the motor vehicle or all the wheels of the motor vehicle. The electrical machine 1 can also be used, for example, with a further electrical machine 1, so that, for example, a respective electrical machine 1 is provided for driving wheels of an associated axle of the motor vehicle.

The electrical machine 1 has a rotor 2 and a stator 3. In this case, the rotor 2 is arranged rotatably about the axis x-x, the sensor 3 being arranged in a stationary manner with respect to a motor housing.

In this case, the stator 3 is formed, for example, in a substantially hollow-cylindrical manner with an outer wall as the stator housing 4 in such a way that it surrounds a substantially cylindrical spatial region 5 in which the rotor 2 is arranged in a rotatable manner. The stator 3 is substantially hollow-cylindrical or occupies a substantially hollow-cylindrical spatial region 5.

The rotor 2 has a rotor shaft 6 which is arranged in a manner mounted rotatably about the axis x-x.

The stator 3 has a stator core 7 with a stator winding 8.

The stator has fluid ducts 9 which extend in the stator 3 in an axial direction from a first axial side 10 to an opposite second axial side 11.

A fluid-distributing chamber 12 with a coolant inflow 13 is provided on the first axial side 10, wherein the coolant inflow 13 communicates with the fluid-distributing chamber 12 and the fluid-distributing chamber 12 communicates with the fluid ducts 9 for the purpose of distributing a coolant flowing in at the coolant inflow 13 to the fluid ducts 9.

A fluid-collecting chamber 14 with a coolant outflow 15 is provided on the second axial side 11. The fluid-collecting chamber 14 communicates with the coolant outflow 15 and the fluid-collecting chamber 14 collects the coolant arriving from the fluid ducts 9 and conducts the coolant to the coolant outflow 15.

The fluid ducts 9 extend substantially in an axial direction in the stator 3, wherein a large number of fluid ducts 9 are arranged distributed over the circumference of the stator 3. In this case, the fluid ducts 9 are connected to the fluid-distributing chamber 12, which has an extent substantially in the radial direction and in the circumferential direction, on the first axial side 10 in order to distribute the coolant flowing in from the coolant inflow 13 to the fluid ducts 9. In this case, the fluid ducts 9 are connected to the fluid-collecting chamber 14, which has an extent substantially in the radial direction and in the circumferential direction, on the second axial side 11 in order to collect the coolant arriving from the fluid ducts 9 and to conduct it to the coolant outflow 15.

The coolant inflow 13 is arranged on the first axial side 10 on a first circumferential side 16, wherein the coolant outflow 15 is arranged on the second axial side 11 on a second circumferential side 17. This creates non-uniformities in the flow through the fluid ducts 9, the fluid-distributing chamber 12 and the fluid-collecting chamber 14.

Therefore, an embodiment of the invention provides a bypass duct 18 which leads from the coolant inflow 13, toward a fluid inlet 19, into the fluid-collecting chamber 14, wherein the fluid inlet 19 is arranged on the second axial side 11 on the first circumferential side 16.

The stator 3 has a stator housing 4 which bounds the stator 3 on the outside. The bypass duct 18 runs, by way of example, along the stator housing 4 in an axial direction from the first axial side 10 to the second axial side 11.

In this case, the bypass duct 18 can be integrated into the stator housing 4 or can be connected to the stator housing 4.

Therefore, the bypass duct 18 can be in the form of a pipeline which runs outside the stator housing 18, for example.

In this case, the pipeline can be connected, in particular can be soldered, welded or adhesively bonded, to the stator housing 4, for example.

As an alternative, the bypass duct 18, as a fluid duct, can also be integrated in one piece, in particular by casting, injection-molding or by mechanical machining, such as by means of drilling for example, into the wall 20 of the stator housing 4.

In order to achieve targeted cooling of the stator 3, it is expedient when the coolant inflow 13 and the bypass duct 18 are dimensioned in such a way that the coolant volume flow through the bypass duct 18 corresponds to at most ⅓ of the coolant volume flow supplied to the stator 3 and the coolant volume flow supplied through the coolant inflow 13 corresponds to at least ⅔ of the coolant volume flow supplied to the stator 3.

It is clear from FIG. 2 that the second circumferential side 17 is substantially opposite the first circumferential side 16, that is to say is arranged substantially at an angle of 180° with respect to the axis of symmetry x-x of the stator 3 or the axis of rotation x-x of the rotor 2.

According to an embodiment, the stator 3 has an end winding 21 of the stator winding on the first axial side 10 and/or on the second axial side 11. In this case, an end winding 21 of the stator winding can be arranged in the fluid-distributing chamber 12 or can be arranged in a space which is fluidically connected to the fluid-distributing chamber 12 and/or an end winding 21 of the stator winding can be arranged in the fluid-collecting chamber 14 or can be arranged in a space which is fluidically connected to the fluid-collecting chamber 14. Particularly good cooling of the respective end winding 21 is achieved as a result.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Electrical machine
2 Rotor
3 Stator
4 Stator housing
5 Spatial region
6 Rotor shaft
7 Stator core
8 Stator winding
9 Fluid duct
10 First axial side
11 Second axial side
12 Fluid-distributing chamber
13 Coolant inflow
14 Fluid-collecting chamber
15 Coolant outflow
16 First circumferential side
17 Second circumferential side
18 Bypass duct
19 Fluid inlet
20 Wall
21 End winding

The invention claimed is:
1. An electrical machine in the form of a drive machine of an electrically driven motor vehicle, comprising:
   a rotor; and
   a stator that occupies a substantially hollow-cylindrical spatial region, the stator comprising:
      a stator core with a stator winding; and
      fluid ducts which extend in the stator in an axial direction from a first axial side to an opposite second axial side, wherein:

a fluid-distributing chamber with a coolant inflow is provided on the first axial side, the coolant inflow communicates with the fluid-distributing chamber and the fluid-distributing chamber communicates with the fluid ducts for the purpose of distributing an inflowing coolant to the fluid ducts, a fluid-collecting chamber with a coolant outflow is provided on the second axial side, the fluid-collecting chamber communicates with the coolant outflow and the fluid-collecting chamber collects the coolant arriving from the fluid ducts and conducts it to the coolant outflow, the coolant inflow is arranged on the first axial side on a first circumferential side and the coolant outflow is arranged on the second axial side on a second circumferential side, a bypass duct is provided, which leads from the coolant inflow toward a fluid inlet into the fluid-collecting chamber, and the fluid inlet is arranged on the second axial side on the first circumferential side.

2. The electrical machine as claimed in claim 1, wherein the stator has a stator housing which bounds the stator on an outside, wherein the bypass duct runs along the stator housing in an axial direction from the first axial side to the second axial side.

3. The electrical machine as claimed in claim 2, wherein the bypass duct is integrated into the stator housing or is connected to the stator housing.

4. The electrical machine as claimed in claim 3, wherein the bypass duct is a pipeline which runs outside the stator housing.

5. The electrical machine as claimed in claim 4, wherein the pipeline is soldered, welded or adhesively bonded to the stator housing.

6. The electrical machine as claimed in claim 3, wherein the bypass duct, as a fluid duct, is integrated in one piece by casting, injection-molding or by mechanical machining into the wall of the stator housing.

7. The electrical machine as claimed in claim 1, wherein the coolant inflow and the bypass duct are dimensioned such that the coolant volume flow through the bypass duct corresponds to at most ⅓ of the coolant volume flow supplied to the stator and the coolant volume flow supplied through the coolant inflow corresponds to at least ⅔ of the coolant volume flow supplied to the stator.

8. The electrical machine as claimed in claim 1, wherein the second circumferential side is substantially opposite the first circumferential side with respect to an axis of symmetry of the stator or an axis of rotation of the rotor.

9. The electrical machine as claimed in claim 1, wherein the stator has an end winding of the stator winding on the first axial side and/or on the second axial side.

10. The electrical machine as claimed in claim 1, wherein an end winding of the stator winding is arranged in the fluid-distributing chamber or is arranged in a space which is fluidically connected to the fluid-distributing chamber.

11. The electrical machine as claimed in claim 6, wherein the bypass duct is integrated via drilling into the wall of the stator housing.

12. The electrical machine as claimed in claim 8, wherein the second circumferential side is arranged at an angle of 180° with respect to the axis of symmetry of the stator or the axis of rotation of the rotor.

13. The electrical machine as claimed in claim 1, wherein an end winding of the stator winding is arranged in the fluid collecting chamber or is arranged in a space which is fluidically connected to the fluid-collecting chamber.

14. The electrical machine as claimed in claim 10, wherein an end winding of the stator winding is arranged in the fluid-collecting chamber or is arranged in a space which is fluidically connected to the fluid-collecting chamber.

\* \* \* \* \*